(12) United States Patent
O'Connor et al.

(10) Patent No.: US 6,755,211 B1
(45) Date of Patent: Jun. 29, 2004

(54) MICROFLUIDIC SYSTEMS WITH INTER-CHANNEL IMPEDANCES

(75) Inventors: Stephen D. O'Connor, Pasadena, CA (US); Eugene Dantsker, Sierra Madre, CA (US); Marci Pezzuto, Altadena, CA (US)

(73) Assignee: Nanostream, Inc., Pasadena, CA (US)

( * ) Notice: Subject to any disclaimer, the term of this patent is extended or adjusted under 35 U.S.C. 154(b) by 0 days.

(21) Appl. No.: 10/405,109

(22) Filed: Mar. 31, 2003

Related U.S. Application Data (63) Continuation of application No. 09/550,184, filed on Apr. 14, 2000, now Pat. No. 6,561,208.

(51) Int. Cl.$^7$ ................................................ F15C 1/00
(52) U.S. Cl. .................. 137/554; 137/315.01; 137/827; 137/833; 137/565.17; 251/368
(58) Field of Search ................................. 137/833, 827, 137/565.17, 554, 315.01; 251/368

(56) References Cited

U.S. PATENT DOCUMENTS

| | | | |
|---|---|---|---|
| 3,568,692 A | 3/1971 | Metzger et al. | 137/81.5 |
| 3,587,615 A | 6/1971 | Thomson | 137/81.5 |
| 3,680,576 A | 8/1972 | Kiwak | 137/81.5 |

(List continued on next page.)

FOREIGN PATENT DOCUMENTS

| | | | | |
|---|---|---|---|---|
| EP | 1 106 244 A2 | 6/2001 | | B01J/19/00 |
| EP | 1 123 734 A2 | 8/2001 | | B01J/19/00 |
| WO | WO 98/45693 | 10/1998 | | G01N/27/26 |
| WO | WO 98/55852 | 12/1998 | | G01N/27/26 |
| WO | WO 99/15888 | 4/1999 | | G01N/27/26 |
| WO | WO 99/19717 | 4/1999 | | G01N/25/22 |
| WO | WO 99/60397 | 4/1999 | | G01N/33/483 |
| WO | WO 99/29497 | 6/1999 | | B32B/3/00 |
| WO | WO 99/33559 | 7/1999 | | B01J/19/00 |
| WO | WO 99/34909 | 7/1999 | | B01J/19/00 |
| WO | WO 99/48599 | 9/1999 | | B01F/5/06 |
| WO | WO 99/61888 | 12/1999 | | G01N/15/14 |
| WO | WO 00/21659 | 4/2000 | | B01J/19/00 |
| WO | WO 00/22436 | 4/2000 | | G01N/33/567 |
| WO | WO 01/04909 A1 | 1/2001 | | G25B/9/00 |
| WO | WO 01/88204 | 11/2001 | | C12Q/3/00 |

OTHER PUBLICATIONS

Jackman, Rebecca J., et al., *Electrochemistry and soft lithograph: A route to 3–D microstructures*, Chemtech, May 1999, pp. 18–30.

Xia, Younan, et al., *Unconventional Methods for Fabricating and Patterning Nanostructures*, "Chem. Rev.," Mar. 1999, 99:1823–1848.

Folch, A., et al., *Molding of Deep Polydimethylsiloxane Microstructures for Microfluidics and Biological Applications*, "Transitions of the ASME," Feb. 1999, 121:28–34.

Duffy, David C., et al., *Rapid Prototyping of Microfluidic Systems in Poly(dimethylsiloxane)*,"Analytical Chemistry," 70:4974–4984.

(List continued on next page.)

*Primary Examiner*—A. Michael Chambers
(74) *Attorney, Agent, or Firm*—Vincent K. Gustafson; Michael F. Labbee (57) ABSTRACT

Microfluidic systems and devices having integrated fluidic impedances are provided. Such impedances hinder the passage of fluid at low differential pressures, but allow fluid flow at higher differential pressures. Impedances are formed at the overlap of two or more microfluidic channels contained in different layers of a device. Such devices can be rapidly prototyped and can be assembled to contain multiple fluidic impedances to perform complex fluid handling tasks, including the metering of small aliquots from a larger fluid volume. Various means may be used to overcome the fluidic impedances.

28 Claims, 9 Drawing Sheets

U.S. PATENT DOCUMENTS

| | | | | |
|---|---|---|---|---|
| 4,426,451 A | | 1/1984 | Columbus | 436/518 |
| 4,606,375 A | * | 8/1986 | Hockaday | 137/828 |
| 4,946,795 A | | 8/1990 | Gibbons et al. | 436/179 |
| 5,194,133 A | | 3/1993 | Clark et al. | 204/299 R |
| 5,230,866 A | | 7/1993 | Shartle et al. | 422/103 |
| 5,300,370 A | | 4/1994 | Washington et al. | 429/34 |
| 5,376,252 A | | 12/1994 | Ekström et al. | 204/299 R |
| 5,385,709 A | | 1/1995 | Wise et al. | 422/98 |
| 5,443,890 A | | 8/1995 | Öhman | 428/167 |
| 5,545,367 A | | 8/1996 | Bae et al. | 264/401 |
| 5,595,712 A | | 1/1997 | Harbster et al. | 422/129 |
| 5,640,995 A | | 6/1997 | Packard et al. | 137/597 |
| 5,658,515 A | | 8/1997 | Lee et al. | 264/219 |
| 5,698,299 A | | 12/1997 | Schmidt et al. | 428/209 |
| 5,744,366 A | | 4/1998 | Kricka et al. | 436/63 |
| 5,872,010 A | | 2/1999 | Karger et al. | 436/173 |
| 5,971,355 A | | 10/1999 | Biegelsen et al. | 251/129.06 |
| 6,129,973 A | | 10/2000 | Martin et al. | 428/166 |
| 6,167,910 B1 | | 1/2001 | Chow | 137/827 |
| 6,190,034 B1 | | 2/2001 | Nielsen et al. | 366/336 |
| 6,296,020 B1 | * | 10/2001 | McNeely et al. | 137/806 |
| 6,494,414 B2 | * | 12/2002 | Benito-Navazo | 248/68.1 |
| 6,494,614 B1 | | 12/2002 | Bennett et al. | 366/336 |
| 6,557,575 B1 | * | 5/2003 | Gerhardt et al. | 137/13 |
| 6,561,208 B1 | * | 5/2003 | O'Connor et al. | 137/15.18 |

OTHER PUBLICATIONS

Grzybowski, B.A., et al., *Generation of Micrometer–Sized Patterns for Microanalytical Applications Using a Laser Direct–Write Method and Microcontact Printing*, "Analytical Chemistry," Nov. 1998, 70:4645–4652.

González, C., et al., *Fluidic interconnects for modular assembly of chemical microsystems*, "Sensors and Actuators B," Jan. 1998, 49:40–45.

Qin, Dong, et al., *Microfabrication, Microstuctures and Microsystems*, "Topics in Current Chemistry," 1998 194:1–19.

Fuhr, G., et al., *Biological Application of Microstructures*, "Topics in Current Chemistry," 1998, 194:83–116.

Shoji, Shuichi, *Fluids for Sensor Systems*, "Topics in Current Chemistry," 1998, 194:163–188.

Córdova, Emilio, et al., *Noncovalent Polycationic Coatings for Capillaries in Capillary Electrophoresis of Proteins*, "Analytical Chemistry," Apr. 1997, 69:1370–1379.

McCormick, Randy M., et al., *Microchannel Electrophoretic Separations of DNA in Injection–Molded Plastic Substrates*, "Analytical Chemistry," Dec. 1997, 69:2626–2630.

Martynova, Larisa, et al., *Fabrication of plastic microfluid channels by imprinting methods*, "Analytical Chemistry," 1997, 69:4783–4789.

Kovacs, Gregory T.A., et al., *Silicon Micromachining Sensors to Systems*, "Analytical Chemistry News & Features," Jul. 1996, pp. 407A–412A.

Shoji, Shuchi, et al., *Microflow devices and systems*, "J. Micromech. Microeng.," Oct. 1994, 4:157–171.

McNeely, M.R., et al, *Hydrophobic Microfluidics*, "SPIE," Article H . . . crofluidics.doc.

Schomburg, W.K., et al., *Microfluidic components in LIGA technique*, "J. Micromech. Microeng.," Feb. 1994, 4:186–191.

Weigl, B., et al., "Passive Microfluidics—Ultra–Low–Cost Plastic Disposable Lab–On–A–Chips".

Verpoorte, Elisabeth M.J., et al., *Three–dimensional micro flow manifolds for miniaturized chemical analysis systems*, "J. Micromech. Microeng.," Oct. 1994, 4:246–256.

Altendorf, Eric, et al., *Results Obtained Using A Prototype Microfluidics–Based Hematology Analyzer*, "Silicon–Microfabricated Diffusion–Based Optical Chemical Sensor," D.J. Harrison and A. van den Berg, eds., Kluwer Academic Publishers, Dordrecht, 1998.

Martin, P.M., et al., *Laser micromachinged and laminated microchannel components for chemical sensors and heat transfer applications*, "SPIE—Micromachined Devices and Components III," Sep. 29, 1997, vol. 3224, pp. 258–265.

Yang, Xing, et al., *A MEMS Thermopneumatic Silicone Membrane Valve*, "Sensors and Actuators A: Physical," 1998, vol. 64, pp. 101–108.

Schulte, Thomas, *The Development of Practical Microfluidic–Based Systems for Chemical and Blood Analysis*, "Drug Discovery Technology for the New Millennium," 1999, Chapter 13, pp. 127–135, Conference proceedings: IBC USA Conferences, Inc.: $4^{th}$ Annual Conference on Microfabrication and Microfluidic Technologies.

Becker, Holger, et al., "Silicon as Tool Material for Polymer Hot Embossing," 1999, Proceedings MEMS '99 Orlando, pp. 228–231.

Jeon, Noo Li, et al., *Large–Area Patterning by Vacuum–Assisted Micromolding*, "Adv. Mater. 11," 1999, 11:946–950.

* cited by examiner

MICROFLUIDIC SYSTEMS WITH INTER-CHANNEL IMPEDANCES

STATEMENT OF RELATED APPLICATION(S)

This application is a continuation of U.S. application Ser. No. 09/550,184, filed Apr. 14, 2000 now U.S. Pat. No. 6,561,208 and currently pending.

FIELD OF THE INVENTION

The present invention relates to microfluidic devices and the control of fluid flow within those devices. These devices are useful in various biological and chemical systems, as well as in combination with other liquid-distribution devices.

BACKGROUND OF THE INVENTION

There has been a growing interest in the manufacture and use of microfluidic systems for the acquisition of chemical and biological information. In particular, microfluidic systems allow complicated biochemical reactions to be carried out using very small volumes of liquid. These miniaturized systems exhibit improve response time of reactions, minimize sample volume, and lower reagent usage.

Traditionally, these microfluidic systems have been constructed in a planar fashion using silicon fabrication industry techniques. Representative systems are described, for example, in some early work by Manz et al. (Trends in Anal. Chem. (1990) 10(5): 144–149; Advances in Chromatography (1993) 33: 1–66). These publications show microfluidic devices constructed using photolithography to define channels on silicon or glass substrates and etching techniques to remove material from the substrate to form the channels. A cover plate is bonded to the top of the devices to provide closure.

More recently, a number of methods have been developed that allow microfluidic devices to be constructed from plastic, silicone or other polymeric materials. In one such method, a negative mold is first constructed, and plastic or silicone is then poured into or over the mold. The mold can be constructed using a silicon wafer (see, e.g., Duffy et al., Analytical Chemistry (1998) 70: 4974–4984; McCormick et al., Analytical Chemistry (1997) 69: 2626–2630), or by building a traditional injection molding cavity for plastic devices. Some molding facilities have developed techniques to construct extremely small molds. Components constructed using a lithography, electroplating and molding (LIGA) technique have been developed at the Karolsruhe Nuclear Research center in Germany (see, e.g., Schomburg et al., Journal of Micromechanical Microengineering (1994) 4:186–191), and commercialized by MicroParts (Dortmund, Germany). Jenoptik (Jena, Germany) also uses LIGA and a hot-embossing technique. Imprinting methods in PMMA also have been demonstrated (see, Martynova et al., Analytical Chemistry (1997) 69: 4783–4789). However, these techniques do not lend themselves to rapid prototyping and manufacturing flexibility. Additionally, these techniques are limited to planar structures. Moreover, the tool-up costs for both of these techniques are quite high and can be cost-prohibitive.

Traditionally, fluid manipulation in these fluidic systems is controlled by electrokinetic and/or electrophoretic transport. These techniques involve the use of voltages and currents to control fluidic movement. Electrodes are placed within the channels and sufficient voltage is applied to cause the hydrolysis of water within the device. This hydrolysis produces a charge gradient throughout the channels that causes either fluid to flow, or molecules within the fluid to move. These techniques have numerous problems including, but not limited to, the need for metallic electrodes within the chambers, connection of these electrodes to an outside voltage/current source, and the need for this source. Additionally, the hydrolysis of water often causes the formation of bubbles and radicals, which may have adverse effects on the devices or reactions occurring within the device.

Accordingly, there is a need for microfluidic devices capable of controlled fluid transport without requiring the use of current and voltage.

SUMMARY OF THE INVENTION

The present invention provides microfluidic devices that can control fluid flow. In one embodiment, such microfluidic devices can be rapidly prototyped with minimal tool-up costs, can be easily manufactured at low cost, and are robust.

The microfluidic devices contain fluidic impedances that can control fluid flow. The devices can accommodate the use of a vast array of liquid reagents or solutions including, but not limited to, aqueous solutions and organic solutions. The microfluidic devices of the present invention can be constructed using a variety of manufacturing techniques.

In one embodiment, a device consists of two or more microfluidic channels that are located on different layers of a three dimensional device. The channels are overlapped in certain areas in order to create fluidic impedances. Fluidic impedances hinder fluid flow through the device. The shape and the amount of overlap in the impedances can be controlled in order to alter the differential pressure necessary to cause fluid to flow through the impedances. In a preferred embodiment, a microfluidic device is formed from stencil layers through which channels have been cut, and the layered stencils are held together with adhesives.

In other embodiments, microfluidic impedances can be incorporated into devices constructed using other techniques. In one embodiment, microfluidic impedances are designed into a solid microfluidic device that is constructed using molding technology. In other embodiments, microfluidic impedances are incorporated into devices constructed using etching techniques usually associated with semiconductor processing. These devices can be constructed from etched silicon, glass, or other materials. Microfluidic impedances can be incorporated into devices constructed using still other techniques as well.

In certain embodiments, a microfluidic device contains one or more of these fluidic impedances. In certain embodiments, all of the fluidic impedances are substantially identical. In other embodiments, the impedances differ within a single device.

Definitions

The term "channel" as used herein is to be interpreted in a broad sense. Thus, it is not intended to be restricted to elongated configurations where the transverse or longitudinal dimension greatly exceeds the diameter or cross-sectional dimension. Rather, the term "channel" is meant to comprise cavities or tunnels of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" may be filled with a material that allows fluid flow through the channel, or may contain internal structures comprising valves or equivalent components. A channel as used herein typically has a smallest dimension that is at least about 1 micron but is less than about 500 microns.

The term "microfluidic" as used herein is to be understood to refer to structures or devices through which a fluid is capable of being passed or directed, wherein one or more of the dimensions is less than about 500 microns.

The microfluidic devices described herein are "generic" in that they are modular and can be easily reconfigured into or adapted to any design. In addition, these devices are capable of being used with a variety of pumping and valving mechanisms, including pressure, peristaltic pumping, electrokinetic flow, electrophoresis, vacuum and the like. In addition, the microfluidic devices of the present invention are capable of being used in collaboration with optical detection (e.g., fluorescence, phosphorescence, luminescence, absorbance and colorimetry), electrochemical detection, and any of various suitable detection methods. Suitable detection methods will depend on the geometry and composition of the device. The choice of such detection methods will be within the purview of the skilled artisan.

The term "microfluidic impedance" as used herein is to be understood to refer to a structure within a microfluidic device that hinders fluid flow. These devices are not limited to the particular shapes, geometries and materials provided herein.

The terms "positive pressure" and "negative pressure" as used herein refer to pressures differing from a reference pressure. A preferred reference pressure is atmospheric pressure.

DETAILED DESCRIPTION OF PREFERRED EMBODIMENTS OF THE INVENTION

This invention describes microfluidic devices that contain built-in fluidic impedances for controlling fluid flow. Microfluidic impedances are built into the system so that the flow of fluid occurs in a controlled manner. These impedances hinder fluid flow at certain channel junctions, until the differential pressure across the impedance is sufficient to overcome the impedance, or the nature of the fluid-impedance interface is altered to allow fluid flow to occur. These microfluidic impedances can be incorporated into one or more positions within the device.

A microfluidic impedance is formed by the intersection of two or more channels within layers of a device at an overlap region. Channels are in fluid communication at the overlap region forming the microfluidic impedance. An overlap region has an overlap area defined as the area between the two channels that is open to both channels. For layers substantially parallel to an XY plane, an overlap area is defined in the XY plane that is open to each of the channels in the Z direction. For example, if a 1 mm wide rectangular channel and a 0.5 mm wide rectangular channel are overlapped by 0.6 mm in an arrangement similar to FIG. 2B, the overlap area is 0.3 square millimeters.

An overlap region and overlap area can be of any size and geometry so that the structure has the property of hindering flow of a fluid. The impedance can be overcome, i.e., fluid allowed to flow through the impedance, by increasing the differential pressure at the impedance, for example, by increasing the inlet pressure or by decreasing the outlet pressure. The impedance also can be overcome by changing the nature of the fluid hindered at the impedance.

In one embodiment, the overlap region has an area of less than about 5 square millimeters. In other embodiments, the overlap region can have an area of less than about 4 square millimeters, less than about 2 millimeters, less than about 1 square millimeter, or less than about 0.5 millimeters.

A microfluidic device also can contain a support layer. Such a support layer can be substantially rigid or can be a flexible layer. A support layer can define one surface of a channel in a lower layer. A microfluidic device also can contain an upper or top layer which can form the upper surface of channels in an upper layer.

Importantly, a microfluidic device containing impedances may be tuned for particular applications. Some of the parameters that affect the design of a microfluidic device include the type of fluid to be used, flow rate through the device, temperature, and material composition of the devices. Other parameters can affect the optimal design as well.

Microfluidic devices can be constructed of a wide variety of suitable materials. Such materials include polymers, papers, fabrics and foils. Polymers include, for example, polyesters, polyimides, vinyls, acrylics, polycarbonates, polytetrafluorethylenes, polyurethanes, polyethylenes, polypropylenes, polyvinylidene fluorides, nylons, polyethersulfones, ABS, polyphenylene oxides, silicones and derivatives thereof, as well as similar and equivalent materials. Devices can be constructed from a single material or from a combination of materials.

In embodiments where a device is constructed from modular layers, such layers can be joined with an adhesive.

The adhesive can be, for example, a rubber-based adhesive, an acrylic-based adhesive, a silicone adhesives or a gum-based adhesive. The material used for forming the layer also can be self adhesive. For example, a layer used can be an adhesive tape. Adhesive tapes can, for example, have a polymer layer with one or more sides coated with an adhesive. Many adhesive tapes are known including, for example, pressure-sensitive tapes, chemically-activated tapes, heat-activated tapes and optically-activated tapes. In another embodiment, individual stencil layers can be joined with mechanical pressure. A number of techniques for constructing microfluidic devices from stencil layers are disclosed in application Ser. No. 09/453,029 filed Dec. 2, 1999, the entire disclosure of which is incorporated herein by reference. Other techniques for constructing microfluidic devices are disclosed in application Ser. No. 091453,026 filed Dec. 2, 1999, the entire disclosure of which is incorporated herein by reference.

Devices also can be constructed wherein the channel containing layers are integral, for example, in a solid block. Such devices can be constructed for example using microfabrication techniques, for example, molding, etching, and photopolymerization.

The microfluidic impedances described in the present invention can be constructed in a microfluidic device by controlling the geometry and surface chemistry of the channels that form the fluidic impedance. An impedance is constructed so that fluid flow is hindered at that point, until the differential pressure across the impedance within the device is sufficient to overcome that impedance. By controlling the geometry and surface chemistry of the junction, the differential pressure necessary to overcome the impedance can be altered. A microfluidic device can contain one or more such impedances.

Figures 1A, 1B:
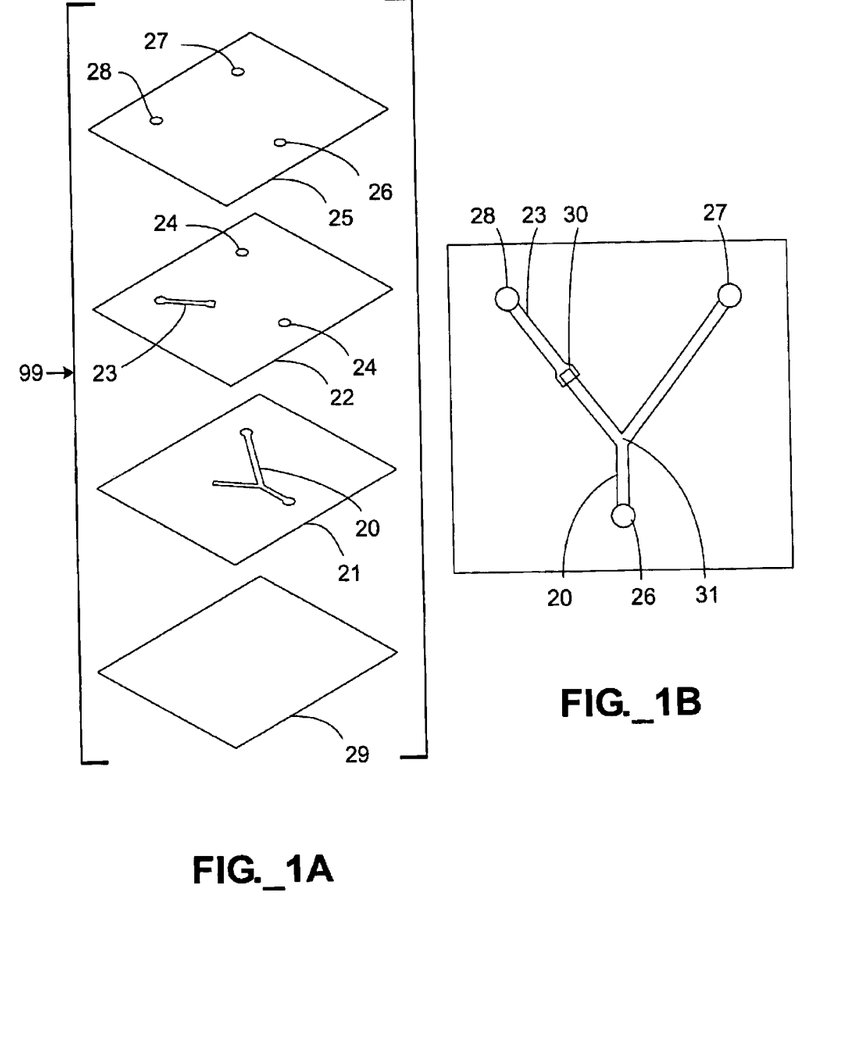
FIG. 1A is an exploded perspective view of a four-layer microfluidic device containing a microfluidic impedance.
FIG. 1B is a top view of the assembled device of FIG. 1A.

In the embodiment shown in FIGS. 1A–1B, a microfluidic device 19 is constructed by sandwiching stencil layers on top of one another. Channels are constructed by removing portions of the stencil layers. Three-dimensional fluid systems are created by forming channels In more than one stencil layer, and connecting said channels by overlapping the channels in each stencil layer. A channel can be cut through a stencil layer, or can be cut in a layer so that the channel is recessed within that layer. Referring to FIG. 1A, a channel network 20 is cut in a stencil layer 21. In a preferred embodiment, the stencil layer comprises single sided adhesive tape, as do the other stencil layers. This stencil layer is adhered to another stencil layer 22 that has another channel 23 and apertures 24 cut into it. This stencil layer is adhered to a solid support 25 that has an inlet port 26 and outlet ports 27, 28. A final stencil layer 29 is adhered to the first stencil layer 21 to complete the formation of the channels.

Fluid flow can be activated within the devices in any number of ways including increasing the pressure at the inlet (using a syringe pump, hand activated syringe or pipettor, gas pressure, etc.), or decreasing the pressure at an outlet (such as with vacuum), capillary forces within the channels, or other methods of flow control. In the examples shown in this patent, fluid flow was activated by applying positive pressure at the inlet port using a syringe pump.

The final device is shown in FIG. 1B. The channels are constructed in such a manner that the overlap 30 of the channel structure on the left produces a microfluidic impedance sufficient to block fluid flow at certain pressures and with certain fluids. When the fluid is injected into the inlet port 26, it passes through the first channel 20 until it reaches the junction point 31. The fluid splits evenly down both chambers until it reaches the overlap region 30. The fluid then preferentially travels down the right channel towards the outlet port 27 and does not continue down the left arm past the overlap region 30.

In order for fluid to flow through the microfluidic impedance 30, the differential pressure across the impedance must be increased or the fluid-impedance interface must change enough for the current pressure to overcome the impedance. This can be accomplished in a number of ways. In certain embodiments, external pressure is applied to the outlet port of the right arm 27. This can be accomplished by simply capping the outlet port and continuing to flow fluid (or air) into the inlet port. Alternatively, positive pressure can be applied at the outlet port 27.

The amount of pressure change that must occur within the microfluidic device in order to overcome a given impedance will greatly depend on the application of interest and sample used. For a system with no built-in microfluidic impedances; the pressure within the channels is a function of a number of factors, including but not limited to the dimensions of the channels, geometry of the channels, flow rate of the fluid, composition of the fluid, and surface chemistry of the channels. Thus, the inherent pressure can be varied depending on the application. In one embodiment, the amount of pressure required to overcome a microfluidic impedance is just slightly above the pressure that is maintained in the device during operation.

In another embodiment, the pressure required to overcome the microfluidic impedance is significantly greater than the ambient pressure within the device. In this embodiment, variations in the sample volume or flow rate will not inadvertently cause fluid to flow through a microfluidic impedances.

In a preferred embodiment, the pressure within the channels can be increased or decreased by altering the flow rate at the inlet port.

In a preferred embodiment, the amount of pressure at various points within the microfluidic device can be monitored using pressure sensors incorporated into the device. In another preferred embodiment, flow sensors can be incorporated at various points within the microfluidic device to monitor the flow rate which is related to the pressure. In these embodiments, feedback can be provided to the system that controls the inlet and outlet ports and flow mechanism in order to trigger the microfluidic impedances and/or optimize the device performance.

In a preferred embodiment, more than one microfluidic impedance is built into a fluid device. In certain embodiments, the impedances are constructed to be identical. In other embodiments, different impedances are used to cause preferential flow within the device. In this manner, more complicated fluidic systems are possible. The differential pressure necessary to overcome these microfluidic impedances can be controlled in a number of manners. These include, but are not limited to altering the geometry and shape of the overlap (including the height of the channels) and altering the chemical nature of the channel at the overlap.

When more than one microfluidic impedance is incorporated into a device and the impedances are designed to be overcome sequentially, the amount of pressure required to overcome each impedance should be sufficiently different so that slight variations in the structure of the devices does not cause the impedances to be overcome in the incorrect order. The amount of pressure required also should be sufficiently different from the starting operating pressure such that slight changes in the flow rate do not cause the impedances to be overcome in the incorrect order.

Figure 2A:
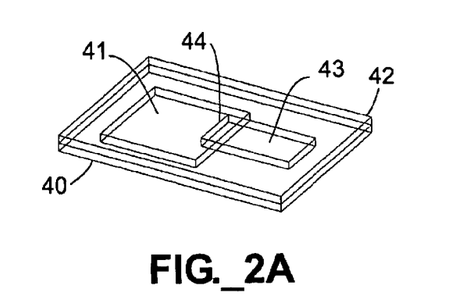
FIGS. 2A–2F are perspective views of six different two-layer microfluidic devices to illustrate various ways to control fluidic impedance based on overlap geometry.

Referring to FIGS. 2A–2F, a number of possible overlap geometries are shown. These geometries can be built into a single device to control the fluid flow within that device. In certain embodiments, more than one of these geometries (or others) is built into a single device. Referring to FIG. 2A, a microfluidic impedance is constructed by adhering two stencil layers together. The first layer 40 has a rectangular inlet channel 41. The second layer 42 has a rectangular channel 43 that is narrower than the first lower channel 41. Fluid enters along the inlet channel 41 and continues until it reaches the overlap junction 44. The fluid flow stops until sufficient pressure has built up within the channel to overcome the microfluidic impedance. Then, fluid passes onto the channel on the next layer 43.

Figure 2B:
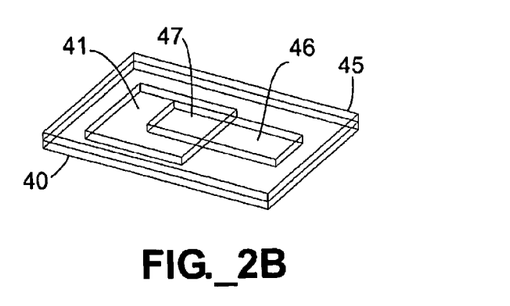

In a preferred embodiment, the impedance can be altered by increasing the length of the overlap of this junction. Referring to FIG. 2B, the lower stencil layer 40 is the same as in FIG. 2A. The upper stencil layer 45 contains a channel 46 that is the similar to the upper channel 43 in FIG. 2A, except that the overlap 47 with 41 extends further in this example, altering the microfluidic impedance.

Figure 2C:
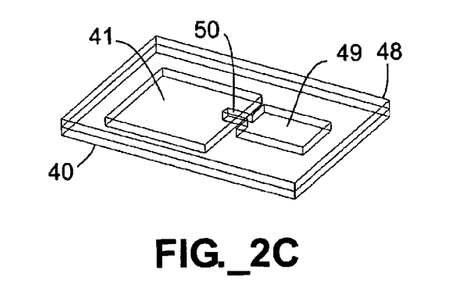

In another preferred embodiment, the microfluidic impedance is adjusted by altering the vertical overlap at the junction. Referring to FIG. 2C, the lower stencil layer 40 is the same as in FIG. 2A. The upper stencil layer 48 has a channel 49 that narrows at the overlap region 50, altering the microfluidic impedance.

Figure 2D:
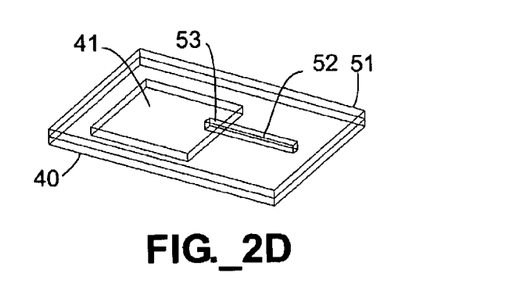

In another preferred embodiment shown in FIG. 2D, the second stencil layer 51 has a channel 52 that is narrower both at the overlap 53 and after the overlap 52.

Figure 2E:
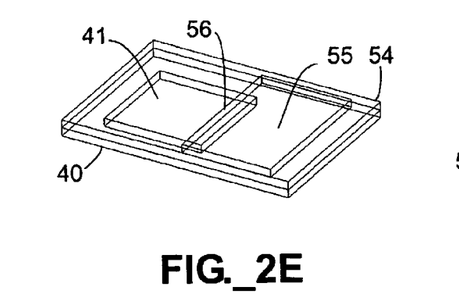
Figure 2F:
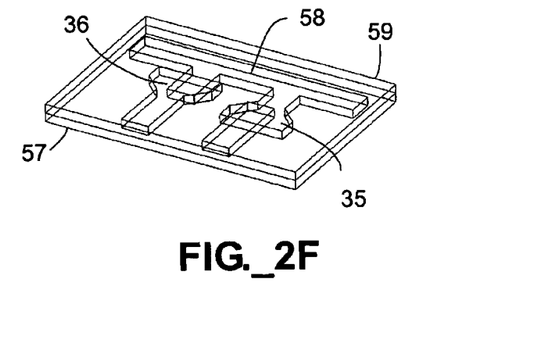

In another preferred embodiment, the outlet channel can be wider than the inlet. In the configurations shown in FIGS. 2A–2D, the inlet channel on the lower layer was wider than the outlet channels on the upper stencil layers. Referring to FIG. 2E, the inlet channel 41 remains the same as in FIGS. 2A–2D. The upper stencil layer 54 defines a channel 55 that is wider at the overlap region 56, altering the junction point 48 and the microfluidic impedance.

In another preferred embodiment, the shape of the overlap regions can be more complicated. Two types of overlap are shown on a single device in FIG. 2F. The first stencil layer 57 has a channel system 58 that branches off into three sections. The second stencil layer 59 has two separate channels that overlap with the lower level channel 58 in two regions 35, 36. In one overlap region 35, the overlap is wider on the lower stencil layer; in the other overlap region 36, the overlap is wider in the stencil layer. Generally, when a buffer solution or other aqueous solution is used and the lower channel 58 is filled first, the overlap region 35 will typically break before the overlap region 36 when polymeric backing type tapes and acrylic based adhesives are used. Typically, it seems that the overlap region that has a large interface area breaks first when aqueous solutions are used. An interface area is the area of the fluid front when the fluid is blocked at a fluidic impedance. For a channel moving fluid in an XY plane, an interface area will have a Z component. Depending on the nature of the impedance, an interface area will be formed with air, a gas or other liquid that fills the device or with the side surface of the channel that defines part of the overlap area.

Other geometries and overlap arrangements are possible. Additionally, the outlet channel can be in the fluidic layer above, or below the layer containing the inlet channel.

In one embodiment, the fluid enters into the overlap region from a channel on a lower layer of the device. When the fluid front reaches the impedance region, it stops at the impedance region until sufficient differential pressure is applied to overcome the impedance and flow into the channel located on the next layer up.

In another preferred embodiment, a spacer layer is placed between the inlet channel (lower layer) and outlet channel (upper layer) that has one or more apertures to allow the fluid to pass. One or more spacer layers can be used. A spacer layer aperture can be of various shapes and sizes. In a certain embodiment, the aperture is shaped the same as the overlap regions or overlap area. In another embodiment, the aperture is larger or smaller than the overlap region.

In another preferred embodiment, the fluid enters the junction region from a channel located on an upper level of the device. The fluid front stops at the junction region until sufficient pressure is applied to overcome the microfluidic impedance, at which time the fluid flows to the channel located on the lower region.

Figure 3A:
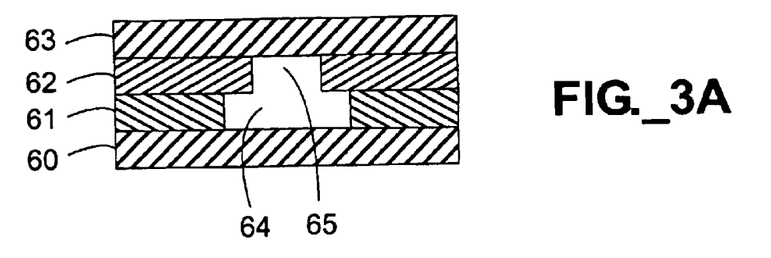
FIGS. 3A–3C are cross-sectional views of three different four-layer microfluidic device to illustrate various ways to control fluidic impedance based on channel height and chemical makeup.
Figure 3B:
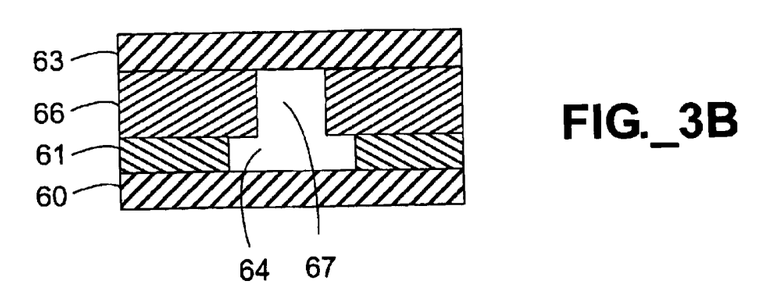
Figure 3C:
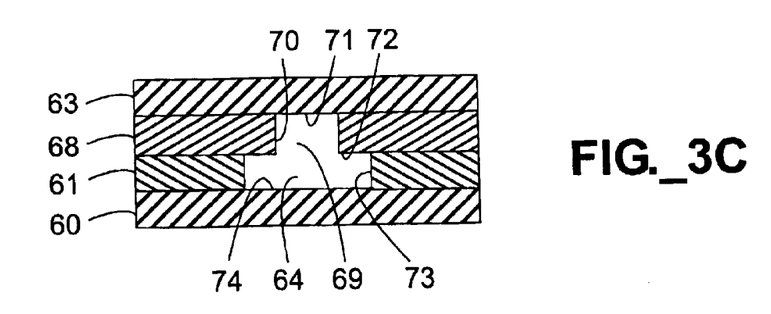

Other factors can also be incorporated to affect the nature of the microfluidic impedance. Referring to FIGS. 3A–3C, cross sections are shown of various microfluidic impedances. Referring to FIG. 3A, a stencil layer 61 is adhered to a solid support 60. A channel 64 has been removed from this stencil. The next stencil layer 62 is adhered to the lower stencil 61. This stencil layer 61 defines a channel 65 as well. In this embodiment, the upper channel 65 has a narrower cross section than the lower channel 64. The channels have the same vertical dimension. The cross section of the overlap region is shown. A top layer 63 is applied to complete the device. In this embodiment, each of the stencil layers 61, 62 is constructed from the same material, and each layer has the same thickness.

In another embodiment, the thickness of one of the stencil layers is altered. Referring to FIG. 3B, the second stencil layer 66 is thicker than the initial layer 61. The overlap region in this embodiment is altered because the upper channel 67 has a larger vertical dimension than the lower channel 64. In this manner, the nature of the microfluidic impedances can be altered.

In another preferred embodiment, the overlap junction is altered by changing the chemical nature in the overlap region. Referring to FIG. 3C, the stencils are identical in shape and thickness as in FIG. 3A, but the second stencil layer 68 is constructed from a different material. This can be accomplished by forming the stencil from a different material or by altering the surface chemistry of this stencil layer. The surface chemistry can be altered in many ways, as one skilled in the art will realize. These methods of altering the surface chemistry include chemical derivatization as well as surface modification techniques such as plasma cleaning or chemical etching. Numerous types of surface chemical derivatization are possible including covalent attachment to the surface and non-covalent attachment. Various types of covalent attachment strategies have been developed and are possible including silanization reactions on the surface of hydroxl terminated surfaces, such as glass, and thiol reactions on the surfaces of metals, such as gold. Other type of surface chemistries are also possible such as carboxylation chemistry on polystyrene surfaces. Other types of attachment chemistries are also possible.

Numerous types of non-covalent chemistries are also possible and have been demonstrated by others. In one embodiment, non-specific ionic interactions are used to attach molecules. In one embodiment, the surface of interest is negatively charged (or the pH is adjusted so that it carries negative charge). Molecules carrying a positive charge will bind to the surface. In one embodiment, one area of a molecule is charged and binds to the surface and the other parts of the molecule then face the solution and are available for further interaction. In an alternative embodiment, the surface is positively charged while the molecule of interest in negatively charged. Other types of non-specific interactions can also be used to connect to the surface such as van-der waals interactions. Using these techniques, surfaces can be derivatized with biomolecules, for example, nucleic acids, proteins and carbohydrates and with small molecules.

Channel 69 has an upper surface 71 formed by the bottom surface of top layer 63, side surfaces 70 formed by the material of layer 68 and, aside from the overlap region, a bottom surface formed by the top of layer 61. Likewise, channel 64 has a bottom surface 74 formed by the top of support layer 60, side surfaces 73 formed from the material of layer 61 and an upper surface 72 formed by the bottom of layer 68. The surface chemistry of these various surfaces can be altered individually.

In an embodiment in which stencil layers are connected with an adhesive, or the layers are self-adhesive, the surface properties are changed depending on which surface is adhesive. For example, the device shown in FIG. 3C can be constructed where layer 61 is double sided tape, layer 63 is single sided tape, lower surface 71 has the adhesive, and layer 68 is non-adhesive. In such an embodiment, upper surface 71 has an adhesive coating, while upper surface 72 has a non-adhesive surface as does side surface 70. In another embodiment, layers 61, 68, and 63 are each single sided adhesive tapes with adhesive on the lower side of each layer. In this embodiment, both upper surfaces 71, 72 are adhesive.

The above-described methods for altering the impedance within a microfluidic device can be used independently or in conjunction with one another. Other methods for altering the nature of the junction also are included, if not specifically stated.

One surprising aspect of the present invention is that the optimal parameters for a given overlap are greatly affected by the nature of the sample that is to be used within the device. It has been found that the optimal geometry for these overlaps changes depending upon the solution used. For example, the geometry shown in FIG. 2F has proven to be very useful when the solution used is buffer or water. However, different geometries have proved useful when the solution is of organic nature, such as acetonitrile. The addition of surfactants to the solutions has an effect on the preferred geometry as well.

In order to overcome the microfluidic impedances within a microfluidic device, the differential pressure across the impedance can be increased to allow fluid to flow across the impedance, or the nature of the impedance must change. This can be accomplished in any number of ways.

In a preferred embodiment, the differential pressure is increased by externally applying pressure. The channels and chamber within a microfluidic device can have outlet connections, so an off board manifold system can be used. The manifold can connect to the inlet and outlet ports of the microfluidic device and switch pressure on and off of these ports in order to provide pressure to the channels when necessary. In one embodiment, this manifold would consist of a valving system that is connected at one end lo a nitrogen tank, or other pressurized system. The valving system could be controlled to selectively apply the pressurized nitrogen to the channels of the device. This system could be controlled manually, or by a computer or other built in control. Additionally, feedback to the valving system could be used for this control. In a preferred embodiment, sensors are used to monitor the fluid flow within the device. When the fluid reaches a certain point, the valving system could be automatically switched as per a given protocol.

In another preferred embodiment, fluid is delivered to the inlet port at a constant rate, and differential pressure across the impedance is altered by design of the device itself. In a preferred embodiment, the outlet port of the microfluidic channels is covered with a material that allows air to pass, but is relatively impermeable to liquids. In this embodiment, fluid fills the channel and pushes the air or gas that was previously in the channel out of the exit port, and through the material. When the channel is filled with fluid and the fluid front reaches the material, the fluid does not pass through the material and the pressure within the microfluidic device increases. This increase can be used to overcome microfluidic impedances within the device.

In a preferred embodiment, more than one type of outlet material can be used. These materials can be chosen so that their properties are such that they have slight resistances to air or gas, and very large resistances to fluid flow. In certain embodiments, the material can be a porous material. The pore size and material composition can be selected to produce the desired effects and impedances. Different materials can be used at various outlets. In this manner, the outlet materials can be used in conjunction with the overlap impedances to produce preferential fluid flow within a device.

In another preferred embodiment, the microfluidic impedances can be overcome by altering the fluid properties. Surprisingly, it has been found that the differential pressure required to overcome a microfluidic impedance is greatly affected by the composition of the sample present. Thus, by altering the fluid properties within the device, a microfluidic impedance may be overcome without increasing the pressure on the fluid. Examples include, but are not limited to, changing the viscosity, surface tension, chemical makeup, salt concentration, surfactant concentration, addition of particles to the fluid, changes in temperature of the fluid or the device, etc.

In a preferred embodiment, fluid enters a device that has a split junction and two impedances immediately after the junction. The impedances are constructed so that one of the impedances is overcome first when water is flowed into the devices. These impedances are constructed so that the opposite impedance is overcome preferentially when the fluid is organic in nature. In this embodiment, water may be injected into the device for a period of time. When an organic solvent is injected into the fluid inlet, the other impedance is broken and the fluid passes down the alternate channel. In this manner, fluid control can be changed without significantly altering the pressure within a device or applied to a device.

Upon consideration of the present disclosure, one of skill in the art will appreciate that many other embodiments and variations may be made in the scope of the present invention. Accordingly, it is intended that the broader aspects of the present invention not be limited to the disclosure of the following examples, but only by the scope of the appended claims and their equivalents.

EXAMPLE 1

Figure 4A:
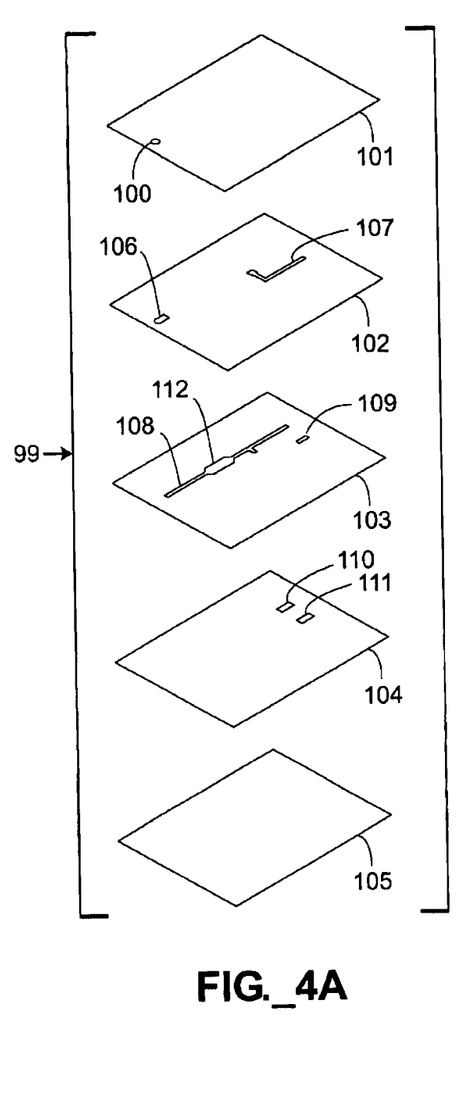
FIG. 4A is an exploded perspective view of a five-layer microfluidic device containing multiple fluidic impedances, the device providing purification and concentration utility.
Figure 4B:
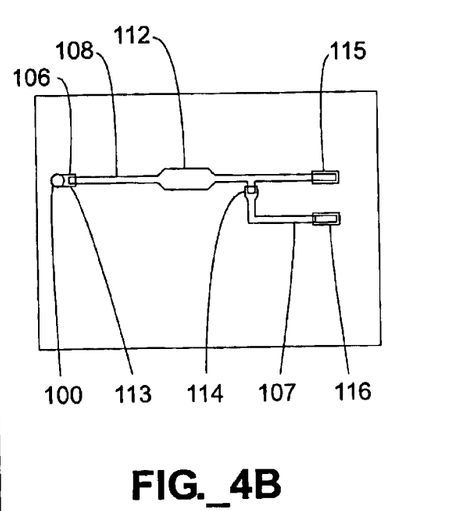
FIG. 4B is a top view of the assembled device of FIG. 4A.

Referring to FIGS. 4A–4B, a microfluidic device 99 designed for purification applications was constructed. A hole 100 (40 mil (1 mm) diameter), representing an inlet port, was drilled in a 0.125 inch thick piece of planar polycarbonate 101. Channels were constructed by cutting channels out of a single sided piece of tape that consists of 1 mil (25 micron) polyester backing with 1 mil (25 micron) medical grade acrylic adhesive using a computer controlled plotter that had been modified with a cutting blade. Two of the stencil layers 102, 103 were formed from the single sided tape with channels 106–108 and aperture 109 defined therein. A third layer 104 was constructed from double sided tape (0.5 mil thick polyester carrier with 1.8 mil thick acrylic adhesive on each side), and defined two chambers 110, 111.

A filter "column" area 112 was constructed and can be filled with a variety of filter materials during the manufacturing process. In certain biological applications, the filter area could be filled with biological filters for performing purification or binding assays. For other applications, organic purifications may be performed by using filter materials. Filter materials include chromatographic and electrophoretic separation materials, for example, silica gel, and materials that accommodate organic separations, including reverse phase silica gel and polyacrylamide. These filling materials, in certain preferred embodiments, can be used to perform useful chemical and/or biological reactions. In one embodiment, the filling materials are filters, which are useful for separating and/or purifying materials. These filters can be chemical or biological filters, or size-exclusion filters. These filters may bind unwanted material or, alternatively, may bind the material of interest so that it may be eluted later. The filling materials include chemical and biological materials, and can be hydrophobic or hydrophilic in nature. The filling material can be charged or neutral. The filling material may be porous, with various pore sizes. In a preferred embodiment, the filling material used to fill a channel or chamber is polymeric. Examples include, but are not limited to, polycarbonate, acrylic, polyurethane, high-density polyethylene (HDPE), ultra-high molecular weight polyethylene (UHMW), polypropylene (PP), polyvinylidene fluoride (PVDF), polytetrafluoroethylene (PTFE), naphion, nylon, and polyethersulfone (PES). In a preferred embodiment, the material used to fill the channel is a carbohydrate, such as agarose, alginate, starch, or carrageenan. The polymer may be an electro-active polymer. In a preferred embodiment, the material used to fill the channel is silica gel. In another preferred embodiment, the material used to fill the channel is SEPHADEX® or SEPHACIL®. In another preferred embodiment, the material used to fill the channel is acrylamide or agarose. In another preferred embodiment, the material used to fill the channel is hydroxyapatite.

In a preferred embodiment, the filling material used to fill the channel and/or chamber is a biological material. Examples include, but are not limited to, binding proteins, antibodies, antigens, lectin, enzymes, lipids, and any molecules that may interact specifically or non-specifically with one or more of the species in the fluid.

Channels can be filled by any suitable technique including silk screening the material in place, placing a solid filter that has been shaped to be the appropriate size, or chemical derivation of the surface of the channels themselves to act as the filter material. In another preferred embodiment, the channels are constructed and a slurry of filter material is injected into the channels after they are constructed. Powder or liquid can also be injected. Other techniques can also be used.

The stencil layers 102–104 were adhered together and adhered to the polycarbonate support layer 101. A final layer 105 of hydrophobic porous material was adhered to one stencil layer 104. In this embodiment, the porous material was ultra high molecular weight (UHMW) polyethylene, with an average pore size of this material being 2.5 to 4.5 microns.

The assembled device is shown in FIG. 4B. The device has two different overlap regions 113, 114 and two chamber regions 115, 116 where the fluidic network can access the porous material 105. All of the channels in this device are 2 mils high in the vertical dimension. At junction 113, channel 106 is 70 mils wide, channel 108 is 40 mils wide, and the two channels overlap with a horizontal span of 40 mils. At junction point 114, channel 108 is 40 mils wide, channel 107 is 70 mils wide and the channels overlap by 40 mils, providing an overlap area of about 1 square millimeter.

In operation, a fluid sample is injected into the entry port 100. Connections to the port 100 can be made using a standard ten microliter pipette tip that is simply pushed into the port. Alternatively, the entry port 100 can be countersunk and a standard five microliter glass capillary can be used. Other connection methods are possible. The fluid fills the initial channel 106 and stops at overlap region 113. This overlap region 113 is provided to control the initial flow at the inlet. Surprisingly, it has been found that the initial input of sample into a microfluidic device is often sporadic and uncontrollable. The addition of this initial impedance makes the fluid flow much more controllable.

The plug of sample enters the channel 108 and passes through the filter area 112. The fluid then passes down the remainder of the channel 108. When the fluid encounters the microfluidic impedance 114, it does not proceed into the side channel 107, but rather continues within the main channel 108 towards the chamber 115. Once the chamber 115 is filled, the fluid has insufficient energy to cross the filter materials 105. Pressure is built up within the chamber 115 until the microfluidic impedance 114 is overcome. Fluid then passes into the output channel 107.

In practice, the volume of the output chamber 110 Is adjusted to accommodate all of the sample. The sample is injected into the device and the material of interest binds to an affinity filter at 112. A plug of elution buffer (or other solvent) is then injected into the device. When the elution buffer reaches the filter area, the waste chamber 110 becomes full and the microfluidic impedance at 114 is overcome. Thus, the elution buffer is diverted into channel 107. Detection technology can be added to this chamber 111. Alternatively, an output port can be added at this point and the purified sample can be taken off-board for further analysis.

EXAMPLE 2

Figure 5A:
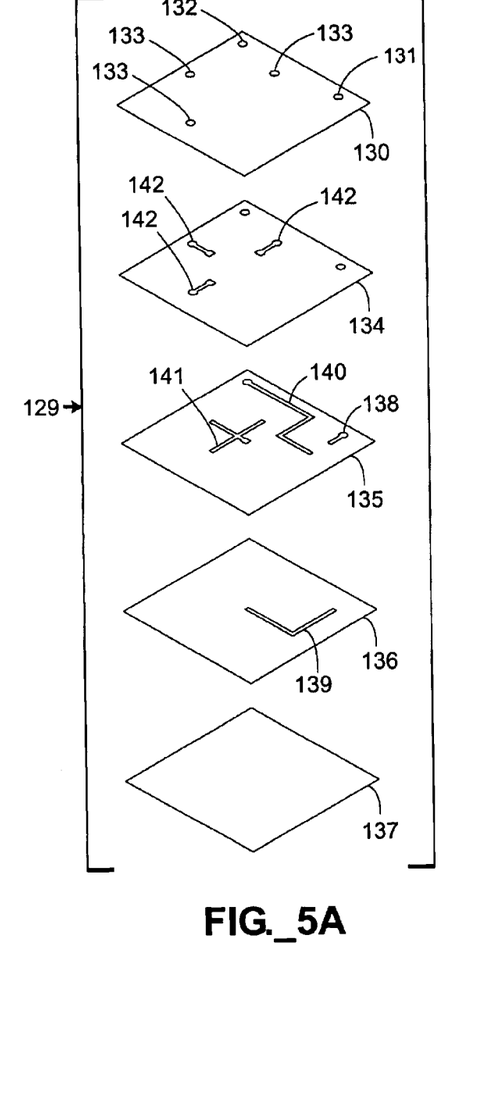
FIG. 5A is an exploded perspective view of a five-layer microfluidic device containing multiple fluidic impedances, the device providing metering utility.
Figure 5B:
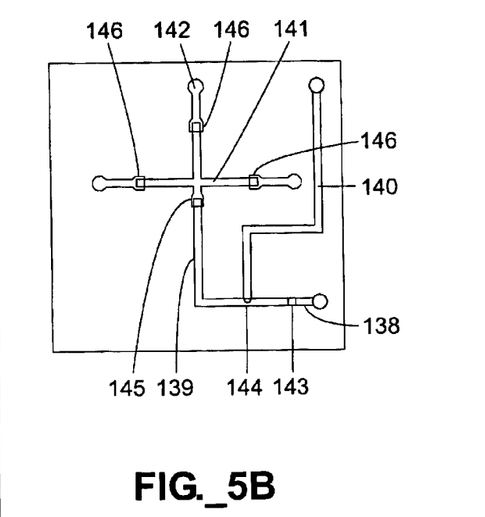
FIG. 5B is a top view of the assembled device of FIG. 5A

FIGS. 5A–5B illustrate a microfluidic device 129 that receives in a quantity of sample that has a large standard deviation, meters a known amount with a smaller standard deviation, divides the metered amount into three equal components, and brings the sample off-board for further analysis.

Referring to FIG. 5A, an inlet port 131, control port 132, and outlet ports 133 were created in a 0.125 inch thick polycarbonate base 130. Four stencil layers were created 134–137 that have channels 138–142 cut into them. In this example, single sided pieces of tape that consists of 3 mil (76 micron) polypropylene backing with permanent water based adhesive is used as the stencil material. The stencil layers were adhered together and onto the polycarbonate base. The assembled device is shown in FIG. 5B and contains four different types of overlap regions 143–146. All of the channels are 3 mils high, thus the overlap regions are 6 mils. At overlap 143, both channels are 40 mils wide and they overlap for 40 mils. At overlap 144, channel 140 is 40 mils wide and tapers down to 20 mils in the overlap region; channel 139 is 40 mils wide and channel 146 extends across 139 for 20 mils. Overlaps 145 and 146 are identical. The entry channels 139,141 are 40 mils wide, the exit portions are 70 mils wide and the overlap is 40 mils in length.

In operation, a sample plug is injected at the inlet port 131 using a syringe pump at a constant flow rate. A fluidic impedance 143 is constructed immediately after the inlet to control the initial fluid flow. The fluid then passes into channel 139 and fills the channel until it reaches impedance 145. At this point, the excess fluid within the sample breaks through the microfluidic impedance at 144 before the microfluidic impedance at 145. The excess fluid passes down channel 140. Once all of the excess fluid has been sent to the waste channel (140), the control port 132 can be plugged, which increases the pressure within the channels. The amount of sample now ready for further analysis is defined by the volume of channel 139 between the two microfluidic impedances 144 and 145. If a different sample volume is desired, the microfluidic impedance 144 can be moved along channel 139 to alter the volume.

Once the air in channel 140 has been compressed sufficiently to build up enough pressure, microfluidic impedance 145 is overcome. The sample now enters chamber 141 and fills the entire chamber up to the impedances 146. Once this chamber has been completely filled, the output microfluidic impedances 146 are overcome and the samples can now be exported off the device for further analysis.

In certain embodiments, the output holes 133 are countersunk and a capillary is inserted into the holes. The countersinks are adjusted to create a tight fit around the capillaries.

EXAMPLE 3

Figure 6A:
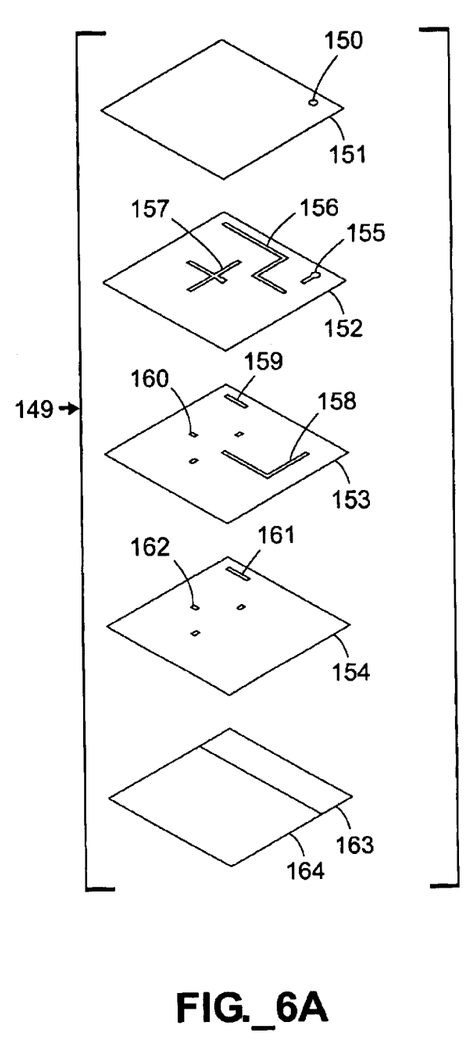
FIG. 6A is an exploded perspective view of a five-layer microfluidic device containing multiple fluidic impedances and including built-in valving.
Figure 6B:
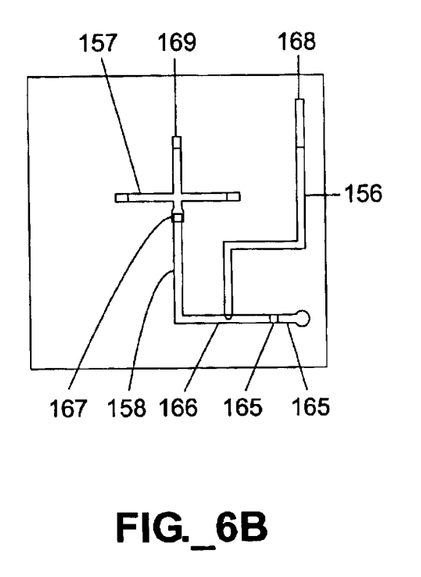
FIG. 6B is a top view of the assembled device of FIG. 6A.

FIGS. 6A–6B illustrate a microfluidic device 149 that receives in a quantity of sample that has a large standard deviation, meters a known sample amount with a smaller standard deviation, and divides the metered amount into three equal aliquots. In this device, all of the metering occurs automatically with a built-in valving system. A detection technology can be added to the device to analyze the metered samples.

Referring to FIG. 6A, an inlet port 150 was created in a 0.125 inch thick polycarbonate base 151. Three stencil layers were created 152–154 that have channels 155–158 and chambers 159–162 cut into them. Two stencil layers 152, 153 were constructed from single sided polypropylene tape with a permanent water-based adhesive having a total thickness of 3 mils. The other stencil 154 was constructed from double sided tape (0.5 mil thick polyester carrier with 1.8 mil (46 micron) thick acrylic adhesive on each side). The stencil layers 152–154 were adhered together and onto the polycarbonate base. Two different types of porous material 163, 164 were adhered to one stencil 154. The first material 163 is polytetrafluoroethylene having an average pore size of 30 to 60 microns and covers the chamber 161. The second material 164 is ultra high molecular weight polyethylene having an average pore size of 2.5 to 4.5 microns and covers the outlet channels 160 and 162.

The assembled device is shown in FIG. 6B and contains three different types of overlap regions 165–167 and two types of outlet channels 168, 169. The overlaps in this example are the same as in Example 2.

In operation, a fluid plug is injected into port 150. The fluid enters the device and passes across microfluidic impedance 165. The fluid fills channel 158 until it reaches microfluidic impedance 167. At this point, the fluid now encounters two impedances, 166 and 167. In order for the fluid to continue to flow, air must be pushed through one or both of the porous materials 163 and 164 at outlets 168 and/or 169. In this example, material 163 covering outlet channel 168 is chosen to have a smaller pressure drop across than that across material 164 covering outlet channel 169. Thus, microfluidic impedance 166 is overcome first. The excess of the fluid sample passes into channel 156 until the front reaches the interface of the porous material 163. At this point, the system would prefer to pass air across the interfaces at 169 than liquid across material 163. The microfluidic impedance at 167 then is overcome. The fluid sample volume, which equals the volume of channel 158 from microfluidic impedance 166 to 167, is split equally into channel 157.

Detection technology can be added to the chambers in 157 for on board analysis of the samples.

The volume of the channels can be adjusted to accommodate various sample sizes. Because of errors in delivering small volumes of samples, sample injection volumes can have substantial variability within a range from a high end to a low end. Importantly, the volume of sample area (within 158) must be smaller than the low end of the sample volume injected. Additionally, the volume of channel 156 and chambers 159 and 161 must be greater than the high end of the sample volume injected. For example, for a sample injection volume of 1 microliter ±30%, the volume of chamber 158 between the two microfluidic impedances (166 and 167) must be less than 700 nanoliters. Additionally, the volume of channels 156, 159, and 161 must be greater than the total possible volume, 1300 nl minus the sample volume. In a preferred embodiment, the metering volume would be 600 nl and the waste system would be 1 microliter.

EXAMPLE 4

Figure 7A:
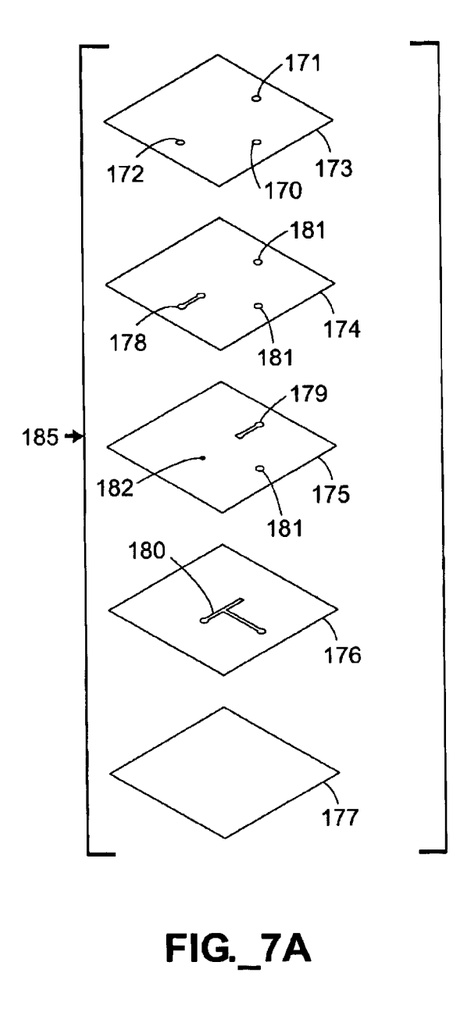
FIG. 7A is an exploded perspective view of a five-layer microfluidic device containing two fluidic impedances.
Figure 7B:
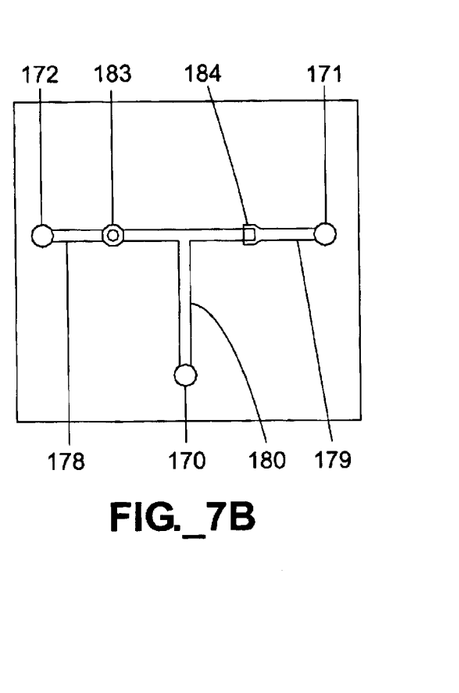
FIG. 7B is a top view of the assembled device of FIG. 7A.

FIGS. 7A–7B illustrate a microfluidic device 185 containing two fluidic impedances. These impedances have been engineered to behave differently when subjected to different fluids. Referring to FIG. 7A, an inlet port 170 and two outlet ports 171, 172 were created in a ⅛" thick polycarbonate base 173. Four stencil layers were created 174–177 that have channels 178–180 and two types of apertures 181, 182 cut into them. The stencils were constructed by cutting channels out of a piece of single sided polypropylene tape with a permanent water-based adhesive having a total thickness of 3 mils. Support stencil layer 177 had no channels or holes. The stencil layers were adhered together and onto the polycarbonate base.

The assembled device is shown in FIG. 7B and contains two different overlap regions 183, 184 that have been engineered to respond differently to different types of materials.

Two examples of operation are described. In the first example, 1X phosphate buffered saline (PBS) buffer was injected at port 170. The outlet ports 171, 172 are both left open. The fluid filled channel 180 until it reaches both overlap regions 183, 184. At this point, the water passed through the overlap region 183 first. The fluid then filled channel 178. When exit port 172 was capped, pressure built up within the system and overlap region 184 was overcome.

In the second example, an industrial scented oil (Pine Forest Scent, #9434 from Goodscents Comp., Oak Creek, Wis.) was injected into the system. Again, channel 180 filled until the oil reached overlap regions 183,184. In this case, overlap region 184 was overcome first. The fluid filled channel 179 exiting at port 171 until it was capped. Then, overlap region 183 was overcome.

EXAMPLE 5

Figure 8A:
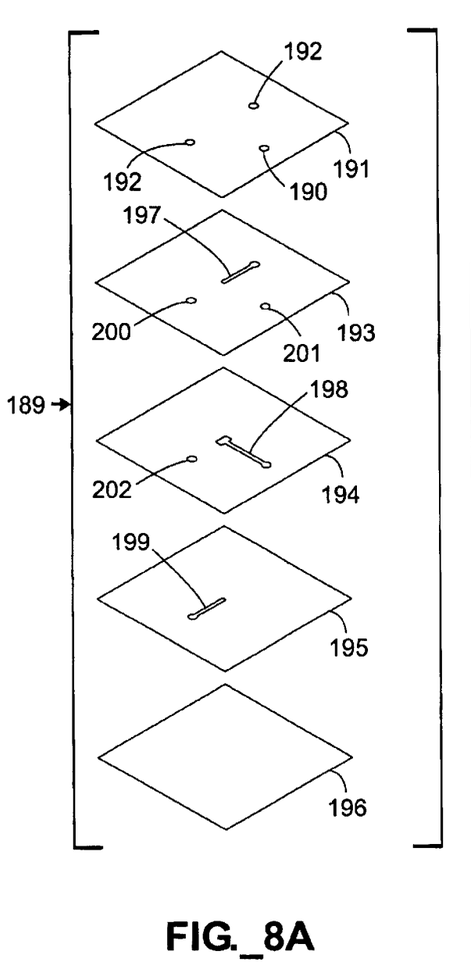
FIG. 8A is an exploded perspective view of a five-layer microfluidic device containing three overlapping channels that meet at an impedance region.
Figure 8B:
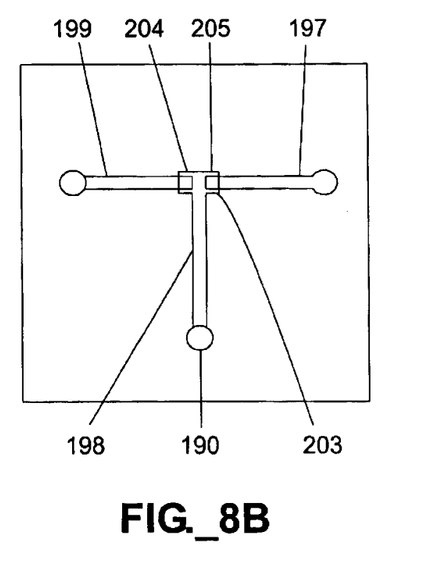
FIG. 8B is a top view of the assembled device of FIG. 8A.

In another preferred embodiment, more than two channels can meet at any microfluidic impedance. FIGS. 8A–8B Illustrate a microfluidic device 189 that was constructed in which channels overlap from 3 different layers of a three dimensional device.

Referring to FIG. 8A, an inlet port 190 was created in a 1/18" thick polycarbonate base 191. Exit ports 192 also were created in this piece of polycarbonate. Three stencil layers 193–195 defined channels 197–199 and apertures 200–202. The lowermost four layers 193–196 were constructed from single sided polypropylene tape with a permanent water-based adhesive having a total thickness of 3 mils. The upper layers 191–195 were adhered together and onto the polycarbonate base.

In operation, a sample plug of 1X PBS was injected at the inlet port 190. The fluid then passed into channel 198 located on the middle layer of the device and filled the channel until it reached junction overlap 203. At this point, the fluid front encountered two microfluidic impedances. In this example, the microfluidic impedance leading to channel 197 broke first. Eight devices were constructed and tested and all eight broke in the same order. Fluid filled channel 197 until sufficient pressure was applied at the exit port to break the microfluidic impedance leading to channel 199.

In this example, fluidic impedances 204, 205 have identical size and geometry; however, because of the asymmetry of the tape layers, impedances 204 and 205 present different surface chemistries at the overlap region. The lower surface of channel 198 is coated with the water-based adhesive while the upper surface of channel 198 is uncoated polypropylene. This example shows how the differential pressure necessary to overcome an impedance is dependent on the nature of the surface chemistry at the impedance.

EXAMPLE 6

Figure 9A:
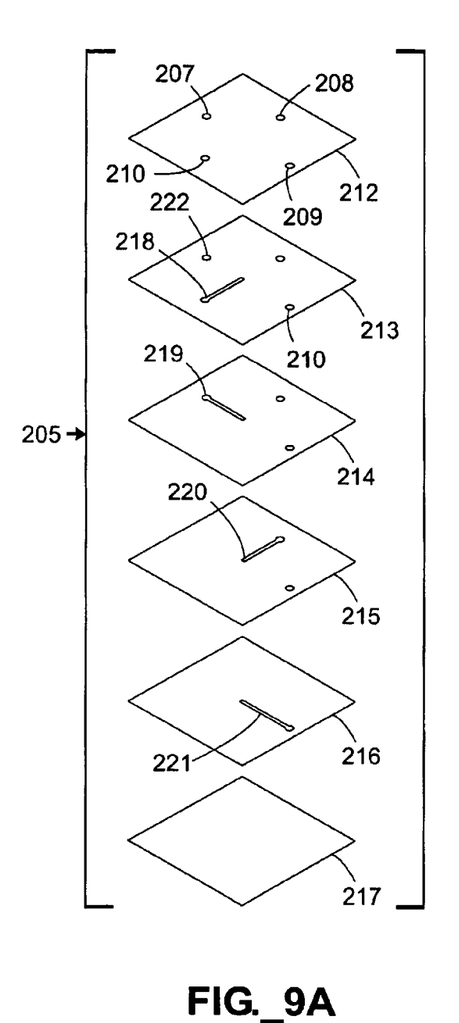
FIG. 9A is an exploded perspective view of a six-layer microfluidic device including four channels each defined in a different layer and meeting at a central overlap region to form a fluidic impedance.
Figure 9B:
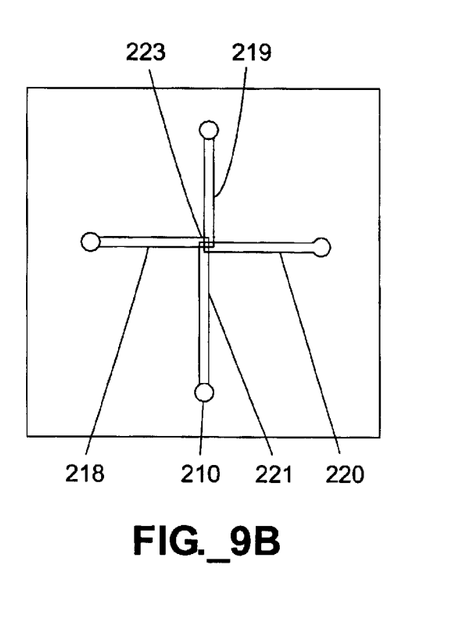
FIG. 9B is a top view of the assembled device of FIG. 9A.

FIGS. 9A–9B illustrate a device 205 having four channels that meet at a central point to results in a multi-layered microfluidic impedance. Referring to FIG. 9A, an inlet port 209 and three outlet ports 206–208 were defined in a 0.125 inch thick polycarbonate base 212. Four stencil layers 213–216 defined channels 218–221 multiple apertures 222. The stencil layers 213–216 were constructed by cutting channels out of a piece of self-adhesive polypropylene tape with a permanent water-based adhesive having a total thickness of 3 mils. The lower cover layer 217 defined no channels or holes. The stencil layers 213–216 and cover layer 217 were adhered together and onto the polycarbonate base 212.

The assembled device is shown in FIG. 9B and contains a fluidic overlap region 223 where all four of the channels 218–221 come together at a single vertical position.

When aqueous buffer was injected into entry port 209, it passed through channel 221 until it reached the overlap region 223. The fluid then entered into channel 220 first, which is on the next adjacent stencil layer 215. The fluid then entered channel 219, and finally it entered channel 218.

The disclosures of all references cited herein are incorporated by reference in their entirety.

It is also to be appreciated that the foregoing description of the invention has been presented for purposes of illustration and explanation and is not intended to limit the invention to the precise manner of practice herein. It is to be appreciated therefore, that changes may be made by those skilled in the art without departing from the spirit of the invention and that the scope of the invention should be interpreted with respect to the following claims.

What is claimed is:

1. A fluidic system comprising:
   at least three device layers;
   a first microfluidic channel defined in a first device layer of the at least three layers;
   a second microfluidic channel defined in a second device layer of the at least three device layers;
   a first overlap region providing a first passive impedance to fluid flow between the first microfluidic channel and the second microfluidic channel;
   means for causing fluid flow between the first microfluidic channel and the second microfluidic channel through the first overlap region.

2. The fluidic system of claim 1 wherein the at least three device layers comprises at least one stencil layer.

3. The fluidic system of claim 1 wherein the first microfluidic channel is defined through the entire thickness of the first device layer, and the second microfluidic channel is defined through the entire thickness of the second device layer.

4. The fluidic system of claim 1, further comprising a plurality of fluidic ports in fluid communication with the first microfluidic channel and the second microfluidic channel.

5. The fluidic system of claim 4 wherein:
   the plurality of fluidic ports comprises a first port and a second port; and
   the flow causing means are selected from the group consisting of: positive pressure means applied to any of the first port and the second port; and negative pressure means applied to any of the first port and the second port.

6. The fluidic system of claim 1 wherein the flow causing means includes electrokinetic means.

7. The fluidic system of claim 1 wherein the flow causing means comprises a plurality of valves.

8. The fluidic system of claim 1, further comprising:
   a third microfluidic channel defined in the second device layer,
   a second overlap region providing a second passive impedance to fluid flow between the third microfluidic channel and the first microfluidic channel; and
   means for causing fluid flow between the first microfluidic channel and the third microfluidic channel through the second overlap region.

9. The fluidic system of claim 6 wherein the first passive impedance and the second passive impedance are substantially the same.

10. The fluidic system of claim 1, further comprising:
    a third microfluidic channel defined in a third device layer of the plurality of device layers,
    a second overlap region providing a second passive impedance to fluid flow between the third microfluidic channel and the first microfluidic channel; and
    means for causing fluid flow between the first microfluidic channel and the third microfluidic channel through the second overlap region.

11. The fluidic system of claim 7 wherein the first passive impedance and the second passive impedance are substantially the same.

12. The fluidic system of claim 1, further comprising a detection region in sensory communication with any of the first channel and the second channel.

13. The fluidic system of claim 1 wherein the detection region is adapted to permit optical detection or electrochemical detection.

14. The fluidic system of claim 1, further comprising a flow sensor in sensory communication with the first channel or the second channel.

15. The fluidic system of claim 1, further comprising at least one spacer layer disposed between the first device layer and the second device layer, wherein the first overlap region includes an aperture defined in the at least one spacer layer.

16. A fluidic system comprising:
- a plurality of device layers;
- a plurality of microfluidic channels defined in the plurality of device layers, including at least a first microfluidic channel, a second microfluidic channel, and a third microfluidic channel;
- a first overlap region providing a first passive impedance to fluid flow between the first microfluidic channel and the second microfluidic channel;
- a second overlap region providing a second passive impedance to fluid flow between the first microfluidic channel and the third microfluidic channel;
- first means for causing fluid flow between the first microfluidic channel and the second microfluidic channel; and
- second means for causing fluid flow between the first microfluidic channel and the third microfluidic channel.

17. The fluidic system of claim 16 wherein the first microfluidic channel is defined through the entire thickness of a first device layer of the plurality of device layers, and the second microfluidic channel is defined through the entire thickness of a second device layer of the plurality of device layers.

18. The fluidic system of claim 16 wherein the first flow causing means and the second flow causing means are integrated.

19. The fluidic system of claim 16 wherein any of the first flow causing means and the second flow causing means comprises a pump.

20. The fluidic system of claim 16 wherein any of the first flow causing means and the second flow causing means comprises a vacuum source.

21. The fluidic system of claim 16 wherein any of the first flow causing means and the second flow causing means comprises at least one electrically conductive material for promoting electrokinetic flow.

22. The fluidic system of claim 16, wherein any of the first flow causing means and the second flow causing means comprises a plurality of valves.

23. The fluidic system of claim 16, further comprising a plurality of fluidic ports in fluid communication with the first microfluidic channel, the second microfluidic channel, and the third microfluidic channel.

24. The fluidic system of claim 23 wherein any of the first flow causing means and the second flow causing means are selected from the group consisting of: positive pressure applied to any fluidic port of the plurality of fluidic ports, and negative pressure applied to any fluidic port of the plurality of fluidic ports.

25. The fluidic system of claim 16 wherein the first passive impedance and the second passive impedance are substantially the same.

26. The fluidic system of claim 16, further comprising a detection region in sensory communication with any of the first channel and the second channel.

27. The fluidic system of claim 16 wherein the detection region is adapted to permit optical detection or electrochemical detection.

28. The fluidic system of claim 16, further comprising a flow sensor in sensory communication with the first channel or the second channel.

* * * * *